July 10, 1934. W. P. HEATH 1,965,836
APPARATUS FOR COOLING AND AERATING LIQUIDS
Filed Feb. 1, 1929
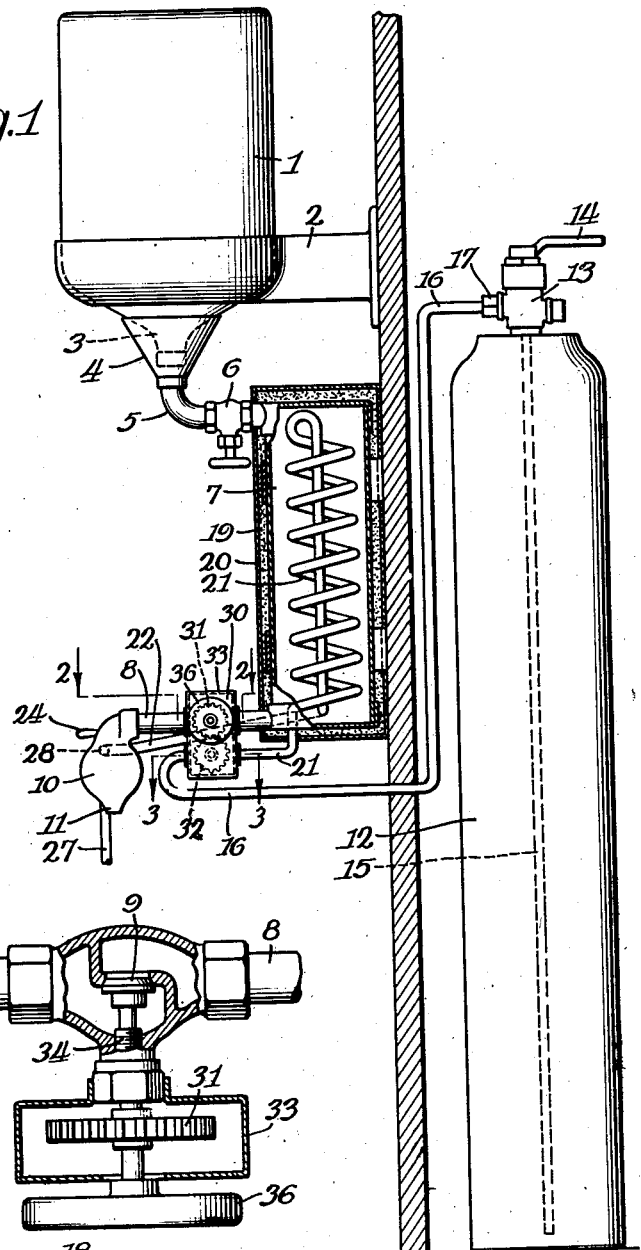
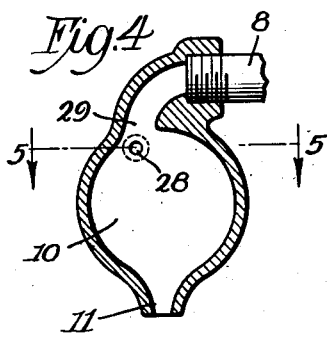
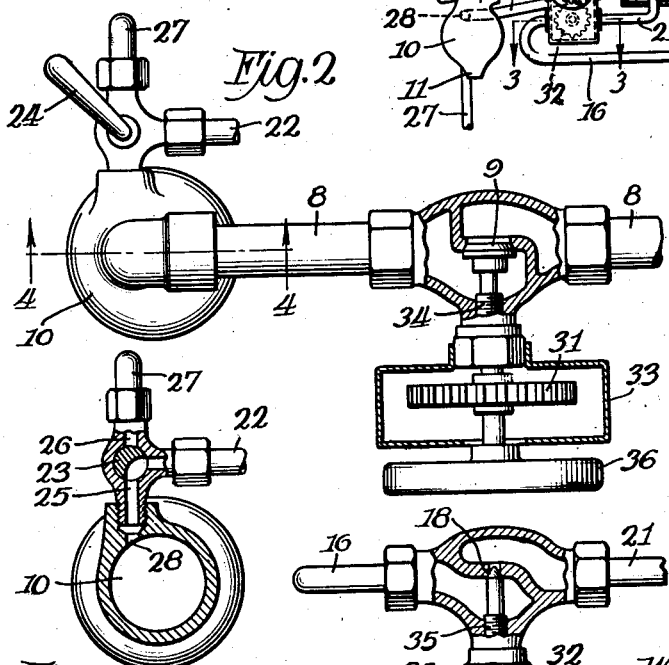
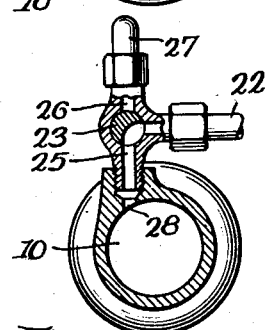
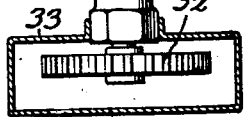
Inventor
Wilfrid Paul Heath
By J. Clarke Hagey
Atty.

Patented July 10, 1934

1,965,836

UNITED STATES PATENT OFFICE 1,965,836

APPARATUS FOR COOLING AND AERATING LIQUIDS

Wilfrid Paul Heath, Seattle, Wash.

Application February 1, 1929, Serial No. 336,690

10 Claims. (Cl. 62—92)

This invention relates to apparatus for cooling and aerating liquids, and more particularly concerns apparatus of this character in which the cooling and aerating agent is a highly compressed gas, such as liquid carbon dioxide.

The principal objects of the invention are to provide apparatus of the aforesaid character which is of simple and inexpensive construction, easy to adjust and operate, and suitable for household and office uses. Other important objects are to provide for a high degree of economy and efficiency in the use of the cooling and aerating agent, and for convenient control of the degrees of refrigeration and aeration to be obtained. These and other objects of the invention will clearly appear in the description to follow.

In the drawing,

Figure 1 is a view, in side elevation and partly in vertical section, of apparatus embodying the invention;

Fig. 2 is a horizontal view, upon an enlarged scale and partly in section through the liquid outlet or faucet valve, taken upon the line 2—2 of Fig. 1;

Fig. 3 is a horizontal view, also upon an enlarged scale and partly in section through the gas outlet or needle valve, taken upon the line 3—3 of Fig. 1;

Fig. 4 is a vertical sectional view, taken upon the line 4—4 of Fig. 2; and

Fig. 5 is a horizontal sectional view, taken upon the line 5—5 of Fig. 4, showing a two-way valve which may be employed for purposes to be described.

Before proceeding with a detailed description of the apparatus shown in the drawing, it may be well to point out that, while the invention is herein shown and described as embodied in a simple small unit form of apparatus for cooling and aerating or carbonating drinking water for household and office uses, the invention is not limited to such embodiment and the apparatus is not limited to such uses. The size, form, and arrangement of the apparatus may be varied to suit requirements, and it may be employed for other uses, such as, for example, in the serving of various prepared beverages and in the mixture and aeration of syrup drinks such as are usually served at soda fountains. In addition to the very apparent advantages of simplicity and economy in apparatus construction and operation, prominent features of the invention reside in the provisions afforded for the practicable, economical, and efficient use of the cooling and aerating agent, and for regulating the degree of refrigeration and aeration to be obtained.

In water coolers at present in use in homes and offices, ice is generally employed as the cooling agent and no provision is made for regulation of the degree of refrigeration. This may depend upon the temperature of the surrounding atmosphere, the amount of ice in the ice compartment, and/or the length of time the water is allowed to occupy the cooling chamber or coil. In hot weather, the ice is melted more rapidly without increasing its refrigerating action upon the water, since most of the refrigeration is dissipated in the atmosphere. Even if the servicing of ice be such as to keep the ice compartment full, the water is drawn off more frequently and in greater quantities, so that it is not allowed to remain in the cooling chamber or coil long enough to be cooled to the desired degree. As compared with these well known undesirable characteristics of the usual water cooler, the present invention provides for the cooling of the water to the desired degree as and at the time it is drawn from the apparatus. The use of the cooling agent occurs at the time of, and in proportion to, the withdrawal of water, and convenient means are provided whereby this proportion may be adjustably determined and whereby, if desired, the cooling agent may be directly applied to the water to further cool and aerate it as it is withdrawn. With the present arrangement, the degree of refrigeration provided by the apparatus may be adjustably predetermined and the cooling agent economically conserved, its use occurring only at the time and in the regulated amounts required.

Mechanical refrigerating units of the compressor types, similar to those used in household refrigerators, have been adapted to the cooling of drinking water, and other types of units, employing drums charged with carbon dioxide gas, have been devised for the cooling and aerating of liquids, but the compressor units are open to the objections of high cost and necessarily frequent servicing, and all are too large and expensive for the general uses already mentioned and, in addition, fail to show any such arrangements as are here provided for economizing in the use of the cooling agent and for regulating the degrees of refrigeration and aeration.

In this invention, intensely cold refrigeration is applied to a small volume of water as the water is passing through the apparatus and is being drawn into a drinking glass or other receptacle, and the temperature of the water is controlled by regulating the rate at which it is supplied and subjected to the refrigerating action of the cooling agent. While it has long been known that temperatures as low as 110 degrees F. below zero may be obtained instantaneously by releasing liquid carbon dioxide through a small orifice, this knowledge has not been employed in producing the economical and efficient results herein obtained, either in the practical manner or for the generally useful purposes herein described. It is to be noted that the full refrigerating action of the first expansion of the gas is here employed; that the gas is released and permitted to expand only during the time water is being withdrawn; that the water is in motion through the system each time the refrigerating action takes place; and that the degree of refrigeration of the water is controlled by regulating its flow.

Referring, now, to the drawing, the liquid supply container is shown as the usual water bottle 1 removably supported in inverted position by the support-bracket 2 with the neck 3 in the water-seal cup 4. An inlet pipe 5, having an inlet controlling valve 6, leads from cup 4 into the upper part of the storage cooling chamber 7, and an outlet pipe 8, having an outlet-controlling or faucet valve 9 (Fig. 2), leads from the lower part of chamber 7 to the upper part of a globular mixing chamber 10, which is provided with a downwardly projecting nozzle 11. With faucet valve 9 fully open, the rate of flow of liquid will be controlled by inlet controlling valve 6.

The cooling agent supply container is shown as the usual liquefied carbon dioxide pressure-tank or drum 12, having the customary headed screw-valve 13, operable by the key 14. Drum 12 is here shown provided with an inner pipe 15 extending from screw-valve 13 to the bottom part of the drum, the purpose of which is to insure the supply of carbon dioxide in liquid form so long as any remains in the drum, it being well understood that, with the drum in upright position, the liquid carbon dioxide will be in the bottom part thereof. With smaller size drums, this pipe 15 may be omitted and the same results obtained by inverting the drum. When the drum to be employed is small and light enough to be easily handled and placed in inverted position, suitable supports would be provided for holding it in such position, so that the proper pipe connection could be conveniently effected and so that screw-valve 13 could be conveniently operated. Such arrangement is not a part of this invention, however, and is not of sufficient importance to require illustration, so it has not been shown.

A comparatively small high-pressure pipe 16 is detachably connected in the usual or any desired manner with drum 12. Such a connection is here illustrated as a common pipe-union 17. When drum 12 is in position and pipe 16 properly connected therewith, the opening of screw-valve 13 will permit the carbon dioxide to extend (under the full drum pressure of approximately 700 lbs. per sq. inch) in the pipe and be available in liquid form at the needle-valve 18 (Fig. 3).

Storage cooling chamber 7 is preferably encased by heat insulating material 19 and an outer jacket-casing 20, and contains a refrigerating pipe-coil 21, one end of which is connected with needle-valve 18 and the other end of which extends, as shown at 22, to a two-way valve 23, having a handle 24, conveniently located for adjustment, and two outlets 25 and 26 (Fig. 5). Outlet 25 opens tangentially into the upper part of mixing chamber 10, and outlet 26 opens into an exhaust-pipe 27, which may lead off to any point desired. The opening 28 of outlet 25 is so positioned in chamber 10 with respect to the outlet 29 (Fig. 4) of pipe 8 that, with valve 23 in the position shown in Fig. 5, when faucet valve 9 is opened to deliver water through outlet 29 and needle-valve 18 is opened to permit liquid carbon dioxide to pass, and to expand into the form of gas in the pipe-coil 21, the outrushing gas from opening 28 will intercept and break up the stream of water as it passes into chamber 10 from outlet 29, whirling and spraying the water in the chamber and mixing with and aerating or carbonating it just before it passes from nozzle 11 into the drinking glass or other receptacle to be placed therebelow.

Heretofore, economy in the use of carbon dioxide gas has been represented by the use of automatic pressure-reducing regulators, but, in such arrangements, the primary object has been the carbonating of the liquid, the refrigeration thereof being obtained only from the amount of gas required to produce the desired degree of carbonation. In the present arrangement, refrigeration is the primary object and the full first expansion of the liquid carbon dioxide is employed for that purpose. Consequently, no automatic pressure reducing regulator is interposed, since it would interfere with obtaining the desired instantaneous refrigerating action. The economy of gas is here obtained by providing for its use only at and during the time liquid is being drawn from the apparatus. Carbonation is a secondary consideration and may be produced or not, as desired, depending wholly upon whether the two-way valve 23 be turned to bring the gas into violent impact with the liquid, as already described, or to exhaust it into the exhaust-pipe 27. The first expansion of the liquid carbon dioxide in the pipe-coil 21 effects instant and intense heat absorption from the surrounding liquid in chamber 7, and the violent impact of the released gas upon the liquid as it passes into chamber 10 produces instant aeration or carbonating thereof.

Outlet or faucet valve 9 and needle-valve 18 are preferably arranged for convenient simultaneous and proportionate operation, and such an arrangement is here shown at 30 as comprising a pair of intermeshing gears 31 and 32, boxed within a guard-casing 33 and carried, respectively, by the screw valve-stems 34 and 35 of valves 9 and 18. A hand-wheel 36 is shown upon valve-stem 34. While gears 31 and 32 are here shown as approximately alike in size and the screw-threads upon valve-stems 34 and 35 appear as of similar pitch, the effective area of valve 9 is substantially greater than that of needle-valve 18. Obviously, the same or different effective flow-controlling ratios of the valves may be obtained through the proportioning of the valve-areas, the gear ratios, or the pitches of the screw-threads upon the valve-stems. With the arrangement shown and described, turning of hand-wheel 36 slightly will open valve 9 sufficiently to draw water without effecting a material opening of valve 18, so that, if desired, unrefrigerated water may be drawn from the apparatus.

It has been mentioned that, with faucet valve 9 fully open, the flow of liquid will be controlled by inlet controlling valve 6, and it will now be seen that the adjustment of valve 6 will control both the degree of refrigeration and aeration of the liquid, since a reduction in the flow of liquid into the storage cooling chamber 7 results in its slower passage therethrough under the refrigerating action of the pipe-coil 21 and at the same time reduces the volume of liquid delivered to the globular mixing chamber 10. Further control may be effected, of course, through the manipulation of hand-wheel 36 to control the flow of the cooling and aerating agent.

The adjustment and operation of the apparatus is extremely simple and will be but briefly described. It will be assumed that pipe 16 is properly connected with drum 12, that screw-valve 13 is open, and that the carbon dioxide is available in liquid form at needle-valve 18 under full drum pressure. It will also be assumed that there is a supply of liquid in water-bottle 1, storage cooling chamber 7 is full, valve 6 is open to a medium degree, and two-way valve 23 is in the position shown in the drawing. The operator places a drinking glass or other receptacle under nozzle 11 and turns hand-wheel 36 slightly. This will permit a substantial amount of the liquid to pass valve 9 from chamber 7 into chamber 10 and out through nozzle 11, without opening needle-valve 18 to an effective degree, and the liquid thus drawn from the apparatus will be at the temperature of the liquid in the chamber 7. Because of the insulated construction of chamber 7, the water therein may be cool from previous use of the apparatus, but it will not be further cooled and will not be carbonated as it is drawn, unless the hand-wheel be turned somewhat further. If hand-wheel 36 be given a substantial turn, it does not necessarily follow that a greater volume of liquid will be drawn, since this may be limited by the position in which inlet controlling valve 6 has been set, but the liquid will be colder and will be carbonated, since the substantial opening of needle-valve 18, obtained by this greater movement of hand-wheel 36, permits the liquid carbon dioxide to pass under full drum pressure into pipe-coil 21, through which it rushes in gaseous form to the chamber 10, and thence out through nozzle 11. As the liquid carbon dioxide changes into a gas in this first expansion and rushes through pipe-coil 21, it instantly absorbs an intense amount of heat from the liquid in chamber 7 surrounding the pipe-coil and, as it rushes into chamber 10 and strikes the outflowing stream of liquid in that chamber, it further refrigerates the liquid by direct contact and mixture therewith and, through the violence of such contact and the spraying mixture thus effected, causes the immediate aeration or carbonating thereof, in the manner already described.

The invention having been fully described, what is claimed is:

1. In apparatus of the character described, the combination, with a liquid cooling chamber and a refrigerating element therein, of means acting upon operation to release liquid from said chamber and simultaneously introduce and permit the expansion of a liquefied gas in said element.

2. In apparatus of the character described, the combination, with a liquid cooling chamber and a refrigerating element therein, of means acting upon operation to cause a flow of liquid through said chamber and simultaneously permit a liquefied gas to expand in and flow through said element.

3. In apparatus of the character described, the combination, with a liquid cooling chamber and a refrigerating element therein, of adjustable means serving to control the flow of liquid into said chamber, and adjustable means acting upon operation to release liquid from said chamber and simultaneously introduce a liquefied gas into said element.

4. In apparatus of the character described, the combination, with a liquid cooling chamber, a refrigerating element therein, and an outlet chamber having outlets opening thereinto from said chamber and from said element, of means acting upon operation to permit liquid to pass from said cooling chamber into said outlet chamber and simultaneously permit a liquefied gas to pass into and through said element into said outlet chamber.

5. In apparatus of the character described, the combination, with a liquid storage chamber and a pipe-coil therein, of separately controllable means for introducing liquid into said chamber and a liquefied gas into said pipe-coil, and means for withdrawing liquid from said chamber simultaneously with the introduction of gas into said pipe-coil.

6. In apparatus of the character described, the combination, with a liquid cooling chamber and a refrigerating pipe-coil therein, of a valve controlling the outlet of liquid from said chamber, a valve controlling the admission of a liquefied gas to said pipe-coil, and means acting upon operation to effect the simultaneous operation of said valves.

7. In apparatus of the character described, the combination, with a liquid cooling chamber and a refrigerating pipe-coil therein, of separately adjustable valves, one controlling the flow and another controlling the rate of flow of liquid through said chamber, a valve controlling the admission of a liquefied gas to said pipe-coil, and means operatively connecting the last said valve with one of the other said valves.

8. In apparatus of the character described, the combination, with a liquid cooling chamber and a refrigerating pipe-coil therein, of a valve adjustably controlling the inlet of liquid into said chamber, a second valve controlling the outlet of liquid from said chamber, a third valve controlling the admission of a liquefied gas to said pipe-coil, and manually operable means for simultaneously adjusting said second and third valves.

9. In apparatus of the character described, the combination of a liquid cooling chamber, a refrigerating pipe-coil therein, an outlet chamber, separate communications leading from said cooling chamber and said pipe-coil to said outlet chamber, and valves controlling each of said communications.

10. In apparatus of the character described, the combination of a liquid cooling chamber, a refrigerating pipe-coil therein, an outlet chamber, separate communications leading from said cooling chamber and said pipe-coil to said outlet chamber, valves controlling each of said communications, and manually operable means for simultaneously adjusting said valves.

WILFRID PAUL HEATH.